July 2, 1929. M. GOOD 1,719,264
WINDSHIELD HEATER
Filed April 21, 1928
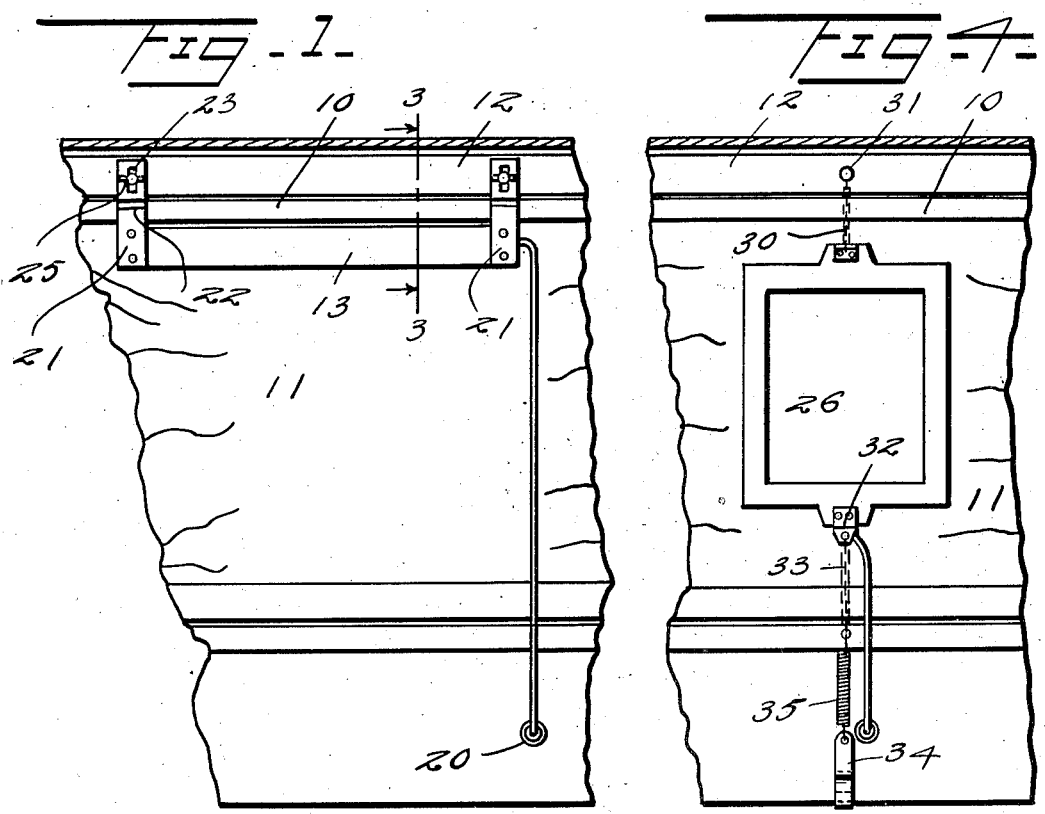
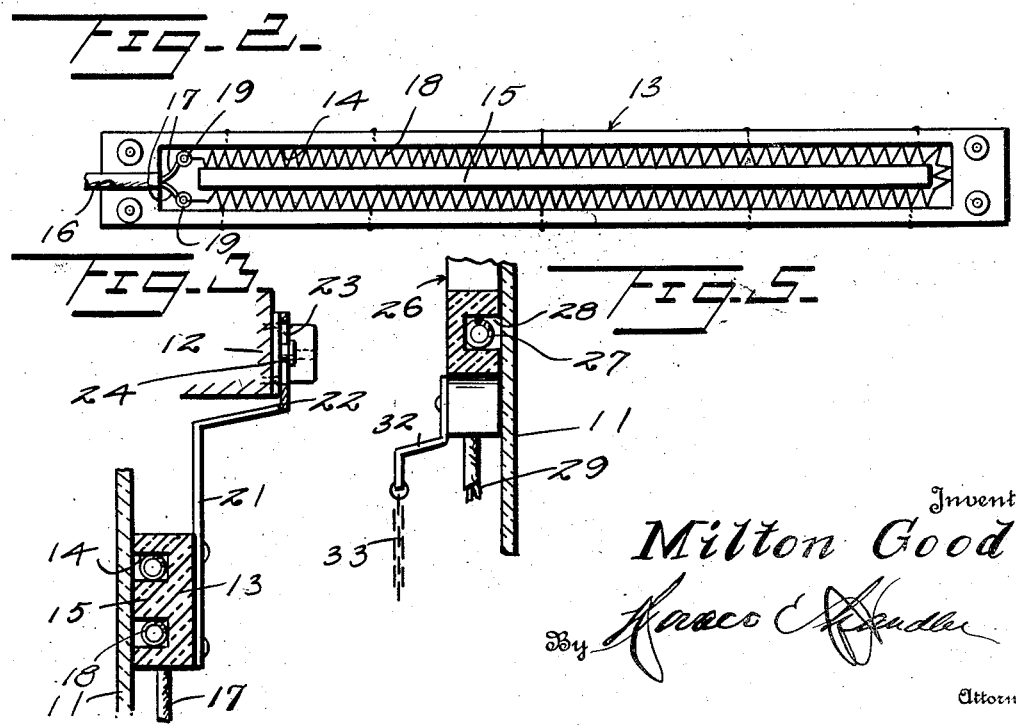
Inventor.
Milton Good
By [signature]
Attorney Patented July 2, 1929.

1,719,264

UNITED STATES PATENT OFFICE.

MILTON GOOD, OF EPHRATA, PENNSYLVANIA.

WINDSHIELD HEATER.

Application filed April 21, 1928. Serial No. 271,894.

This invention relates to new and useful improvements in heaters, and particularly to heaters for automobiles.

It is well known that, when driving through a rain or snow, the rain sometimes freezes on the glass of the windshield of the automobile, or the snow adheres thereto to such an extent as to obscure the view of the driver. In such an event the ordinary windshield wiper is useless, as it will not wipe off the frozen rain or snow.

It is the principal object of the present invention to provide a device which is adapted to be disposed against the inner face of the glass of the windshield, for the purpose of maintaining such glass, within a small radius, at a temperature which will prevent snow adhering thereto, or rain freezing thereon, thus permitting an adequate clear space, on the glass, through which the driver may see the road ahead.

Another object is to provide a heating device of this character which is adapted for use on any automobile, and which is to be manufactured and sold as an accessory, so that anyone may readily attach the same to the automobile, for use during the colder periods, and remove the same when the weather becomes warm.

Other objects and advantages will be apparent from the following description when taken in connection with the accompanying drawing.

In the drawing:

Figure 1 is an elevation of the device, as viewed from the driver's seat, showing one form of the invention.

Figure 2 is an elevation as viewed from the opposite side thereof, showing the electrical heating element.

Figure 3 is a vertical sectional view on the line 3—3 of Figure 1.

Figure 4 is a view similar to Figure 1, showing another form of the invention.

Figure 5 is a vertical sectional view on the line 5—5 of Figure 4, partly broken away.

Referring to the accompanying drawing, and particularly to Figures 1, 2, and 3, 10 represents the upper cross bar of the windshield, 11 the glass thereof, and 12 that portion of the automobile above the windshield, in connection with which the present invention is adapted for use.

The heater comprises an elongated block of suitable insulation 13, in one longer face of which is formed a longitudinal recess 14, and disposed centrally, and longitudinally within the recess is a rib or web 15. An opening 16 is formed in one end of the block, leading out of the end of the recess 14, through which are disposed the electrical conductors 17. Disposed within the recess 14, is a resistance element or coil 18, the ends of which are attached to binding terminals or screws 19, at opposite sides of the opening 16, the adjacent ends of the conductors 17 being also attached to said screws. The other ends of the conductors are connected with a suitable plug 20, which is adapted to be inserted in any suitable socket on the automobile, whereby to transmit electric current to heat the resistance element 18. Attached to each end of the block 13, on the face opposite to that in which is formed the recess 14, is an arm 21, said arm extending at right angles to the longitudinal axis of the block, and having its outer or free end offset, as shown at 22, and formed with a slot 23. Attached to the portion 12, above the windshield, are the plates 24, each having a turnbutton 25 which is adapted to be passed through a slot 23, of an arm 21, and then turned into a position transversely of the slot, whereby to hold the device with its heating element against the face of the glass 11, next the driver. The arms 21 are flexible, whereby to firmly press the block 13 tightly against the glass of the windshield, so that the heat from the resistance element may properly heat the glass to a temperature to prevent adhering of snow or sleet.

During the warm weather, the owner simply turns the buttons 25 until they stand within the slots 23, and then removes the heater. The only parts remaining on the automobile are the plates carrying the buttons, and as these are secured to the automobile top, above the windshield, such plates will not be noticed. When the cold weather again sets in, the owner simply attaches the heater by passing the buttons through the slots of the arms 21, and then turns them transversely of such slots, thus properly positioning the heater against the glass of the windshield.

In Figures 4 and 5 there is shown another form of the heater, which consists of a rectangular frame 26, having a resistance element 27 disposed within the channel 28, and connected to the conductors 29, in the same manner as that of the form just described. To the upper end of the frame 26 is connected one end of a short length of chain 30, the other end of which is adapted to be connected with a button 31, secured to the portion 12, of the automobile, above the windshield. To the lower end of the frame 26 is secured an arm 32, which projects into the automobile, and to the free end of said arm is connected an end of a chain or cord 33, which depends below the windshield, where it is provided with a suitable hook member 34, for engagement beneath the lower edge of the instrument-board of the automobile. Between the chain 33, and the hook 34 there is disposed a length of coil spring 35, to induce tension, whereby to urge the frame 26 tightly against the face of the glass of the windshield.

The invention is adapted to be manufactured as an accessory, to be sold in such stores as handle automobile accessories, and parts, whereby the purchaser may easily attach the device to his automobile, without the assistance of a mechanic, or the use of any other tools than the ordinary screwdriver.

What is claimed is:

As an automobile accessory, a windshield glass heater comprising an electrical heating unit having an insulated base, a flexible element carried by the upper portion of the base for attachment to an automobile above the windshield thereof, an offset member carried by the lower portion of said base, a flexible element carried by the offset member, a spring connected with the lower flexible element, and a hook carried by the spring for engagement with the lower edge of the instrument board of the automobile, whereby to rock and maintain the heating unit in contact with the glass of the windshield.

In testimony whereof, I affix my signature.

MILTON GOOD.